(12) United States Patent
O'Neill et al.

(10) Patent No.: US 11,318,558 B2
(45) Date of Patent: May 3, 2022

(54) FABRICATION OF COMPONENTS USING SHAPED ENERGY BEAM PROFILES

(71) Applicants: Howmedica Osteonics Corp., Mahwah, NJ (US); The Chancellor, Masters and Scholars of the University of Cambridge, Cambridge (GB)

(72) Inventors: William O'Neill, Cambridge (GB); Martin Sparkes, Horts (GB); Jonathon Parkins, Southsea (GB); Eric Jones, Limerick (IE); Lewis Mullen, Englewood, NJ (US)

(73) Assignees: The Chancellor, Masters and Scholars of the University of Cambridge; Howmedica Osteonics Corp., Mahwah, NJ (US)

( * ) Notice: Subject to any disclaimer, the term of this patent is extended or adjusted under 35 U.S.C. 154(b) by 316 days.

(21) Appl. No.: 16/413,028

(22) Filed: May 15, 2019

(65) Prior Publication Data
US 2019/0351505 A1    Nov. 21, 2019

Related U.S. Application Data

(60) Provisional application No. 62/671,699, filed on May 15, 2018.

(51) Int. Cl.
*B29C 64/153* (2017.01)
*B29C 64/268* (2017.01)
(Continued)

(52) U.S. Cl.
CPC .......... *B23K 26/0734* (2013.01); *B22F 10/20* (2021.01); *B23K 26/064* (2015.10);
(Continued)

(58) Field of Classification Search
CPC ................... B22F 10/20; B22F 3/1055; B22F 2003/1056; B22F 2003/1057;
(Continued)

(56) References Cited

U.S. PATENT DOCUMENTS 4,275,288 A    6/1981    Makosch et al.
4,521,087 A    6/1985    Hayes et al.
(Continued)

FOREIGN PATENT DOCUMENTS

CN    101856724 A    10/2010
DE    19961918 A1    7/2001
(Continued)

OTHER PUBLICATIONS

Axicons (Conical Lenses); EKSMA Optics, copyright 2013, downloaded on Jul. 6, 2017, 3 pages.
(Continued)

*Primary Examiner* — Philip C Tucker
*Assistant Examiner* — Jimmy R Smith, Jr.
(74) *Attorney, Agent, or Firm* — Lerner, David, Littenberg, Krumholz & Mentlik, LLP (57) ABSTRACT

A component is fabricated in an additive manufacturing process. Only a portion of a first layer of a first material is at least partially melted to define a first component layer of the component. Only a portion of the second layer of a second material is at least partially melted to define a second component layer of the component in which the entirety of the second component layer is formed simultaneously, and the second component layer is attached to the first component layer.

20 Claims, 5 Drawing Sheets

(51) Int. Cl.
*B23K 26/073* (2006.01)
*B33Y 10/00* (2015.01)
*B23K 26/064* (2014.01)
*B29C 64/277* (2017.01)
*B29C 64/286* (2017.01)
*B22F 10/20* (2021.01)
*B33Y 70/00* (2020.01)
*B33Y 70/10* (2020.01)
*B33Y 30/00* (2015.01)

(52) U.S. Cl.
CPC ........ *B23K 26/0736* (2013.01); *B29C 64/153* (2017.08); *B29C 64/268* (2017.08); *B29C 64/277* (2017.08); *B29C 64/286* (2017.08); *B33Y 10/00* (2014.12); *B33Y 70/00* (2014.12); *B33Y 70/10* (2020.01); *B33Y 30/00* (2014.12)

(58) Field of Classification Search
CPC ..... B22F 2003/1058; B22F 2003/1059; B29C 64/153; B29C 64/264; B29C 64/268; B29C 64/277; B29C 71/04; B29C 64/141; B33Y 70/00; B33Y 70/10
USPC ............................................ 425/174, 174.4
See application file for complete search history.

(56) References Cited

U.S. PATENT DOCUMENTS

| | | | |
|---|---|---|---|
| 4,623,776 A | 11/1986 | Buchroeder et al. | |
| 4,636,611 A | 1/1987 | Penney | |
| 4,642,439 A | 2/1987 | Miller et al. | |
| 4,863,538 A | 9/1989 | Deckard | |
| 4,997,250 A | 3/1991 | Ortiz, Jr. | |
| 5,156,697 A | 10/1992 | Bourell et al. | |
| 5,352,405 A | 10/1994 | Beaman et al. | |
| 5,354,414 A | 10/1994 | Feygin | |
| 5,427,733 A | 6/1995 | Benda et al. | |
| 5,437,820 A | 8/1995 | Brotz | |
| 5,473,426 A * | 12/1995 | Hayano | G01N 21/8901 250/237 R |
| 5,508,489 A | 4/1996 | Benda et al. | |
| 5,876,767 A | 3/1999 | Mattes et al. | |
| 6,031,201 A | 2/2000 | Amako et al. | |
| 6,269,590 B1 | 8/2001 | Weder | |
| 6,281,471 B1 | 8/2001 | Smart | |
| 6,377,336 B1 | 4/2002 | Shiraishi et al. | |
| 6,504,127 B1 | 1/2003 | McGregor et al. | |
| 6,539,045 B1 | 3/2003 | Von Borstel et al. | |
| 6,548,781 B1 | 4/2003 | Brunwinkel | |
| 6,650,480 B2 | 11/2003 | Tanaka | |
| 6,693,257 B1 | 2/2004 | Tanaka | |
| 6,703,582 B2 | 3/2004 | Smart et al. | |
| 6,713,713 B1 | 3/2004 | Caldwell et al. | |
| 6,756,561 B2 | 6/2004 | McGregor et al. | |
| 6,765,175 B2 | 7/2004 | Tanaka et al. | |
| 6,856,630 B2 | 2/2005 | Tanaka | |
| 6,885,433 B2 | 4/2005 | Shiraishi | |
| 7,102,118 B2 | 9/2006 | Acker et al. | |
| 7,151,788 B2 | 12/2006 | Imakado et al. | |
| 7,153,463 B2 | 12/2006 | Leuterer et al. | |
| 7,229,272 B2 | 6/2007 | Leuterer et al. | |
| 7,336,685 B2 | 2/2008 | Tanaka | |
| 7,339,750 B2 | 3/2008 | Brustle et al. | |
| 7,537,722 B2 | 5/2009 | Andersson et al. | |
| 7,688,492 B2 | 3/2010 | Han et al. | |
| 7,710,658 B2 | 5/2010 | Dowski, Jr. et al. | |
| 8,075,814 B2 | 12/2011 | Fruth et al. | |
| 8,247,730 B2 | 8/2012 | Liu et al. | |
| 8,404,994 B2 | 3/2013 | Spennemann et al. | |
| 8,461,478 B2 | 6/2013 | Chen et al. | |
| 8,530,788 B2 | 9/2013 | Tanaka et al. | |
| 8,624,155 B1 | 1/2014 | Scaggs | |
| 8,698,039 B2 | 4/2014 | Heinrici et al. | |
| 8,716,110 B2 | 5/2014 | Fukuyo et al. | |
| 8,724,219 B1 | 5/2014 | Wardlaw et al. | |
| 8,728,387 B2 * | 5/2014 | Jones | C23C 4/02 419/2 |
| 8,804,238 B2 | 8/2014 | Rupp et al. | |
| 8,826,938 B2 | 9/2014 | Moore | |
| 8,845,316 B2 | 9/2014 | Schillen et al. | |
| 8,993,924 B2 | 3/2015 | Ryu et al. | |
| 9,006,608 B2 | 4/2015 | Gubler et al. | |
| 9,035,217 B2 | 5/2015 | Petring et al. | |
| 9,067,361 B2 | 6/2015 | El-Siblani | |
| 9,238,310 B2 | 1/2016 | Grebe et al. | |
| 9,261,702 B2 | 2/2016 | Chan | |
| 9,314,972 B2 | 4/2016 | Green | |
| 9,329,368 B2 | 5/2016 | Rupp et al. | |
| 10,668,537 B2 * | 6/2020 | Karlsen | B23K 26/342 |
| 2002/0149137 A1 | 10/2002 | Jang et al. | |
| 2003/0098295 A1 | 5/2003 | Kawamoto et al. | |
| 2004/0099645 A1 | 5/2004 | Kawamoto et al. | |
| 2006/0113288 A1 | 6/2006 | Kawamoto et al. | |
| 2008/0013170 A1 | 1/2008 | Tanaka | |
| 2009/0283501 A1 | 11/2009 | Erikson et al. | |
| 2011/0305590 A1 | 12/2011 | Wescott et al. | |
| 2012/0157979 A1 | 6/2012 | Li | |
| 2012/0267345 A1 | 10/2012 | Clark et al. | |
| 2013/0270750 A1 | 10/2013 | Green | |
| 2013/0341838 A1 | 12/2013 | Vilaro et al. | |
| 2014/0131921 A1 * | 5/2014 | Kusters | B29C 64/153 264/400 |
| 2014/0163717 A1 | 6/2014 | Das et al. | |
| 2014/0271228 A1 | 9/2014 | Okita et al. | |
| 2014/0361464 A1 | 12/2014 | Holcomb | |
| 2015/0045924 A1 | 2/2015 | Cluckers et al. | |
| 2015/0151491 A1 | 6/2015 | Teulet | |
| 2015/0158111 A1 | 6/2015 | Schwarze et al. | |
| 2015/0183165 A1 | 7/2015 | Abe et al. | |
| 2015/0273622 A1 | 10/2015 | Manabe | |
| 2015/0283613 A1 | 10/2015 | Backlund et al. | |
| 2015/0306819 A1 | 10/2015 | Ljungblad | |
| 2016/0096224 A1 * | 4/2016 | Demuth | B22F 10/20 419/53 |
| 2016/0136730 A1 | 5/2016 | McMurtry et al. | |
| 2016/0184925 A1 | 6/2016 | Huang et al. | |
| 2016/0318129 A1 * | 11/2016 | Hu | B29C 64/282 |
| 2017/0021455 A1 | 1/2017 | Dallarosa et al. | |
| 2018/0161935 A1 * | 6/2018 | Brown | B22F 3/11 |
| 2019/0229252 A1 * | 7/2019 | Leblanc | C04B 35/645 |

FOREIGN PATENT DOCUMENTS

| | | |
|---|---|---|
| DE | 10044522 A1 | 4/2002 |
| DE | 10254847 A1 | 2/2004 |
| DE | 102008048502 A1 | 4/2010 |
| DE | 102011007067 A1 | 10/2012 |
| EP | 3417961 A1 | 12/2018 |
| JP | 2009226473 A | 10/2009 |
| JP | 5033693 B2 | 9/2012 |

OTHER PUBLICATIONS

Dickey et al., Laser Beam Shaping: Theory and Techniques, copyright 2000, Chapter 1 (pp. 10-11), Chapter 2 (pp. 29-30), Chapter 3 (pp. 127-130, 141-144), Chapter 5 (p. 225), Chapter 7 (pp. 279-282, 295-300).

Extended European Search Report including Written Opinion for Application No. EP19174571.0, dated Oct. 10, 2019, pp. 1-10.

* cited by examiner

FABRICATION OF COMPONENTS USING SHAPED ENERGY BEAM PROFILES

CROSS-REFERENCE TO RELATED APPLICATION

The present application claims the benefit of the filing date of U.S. Provisional Application No. 62/671,699 filed May 15, 2018, the disclosure of which is hereby incorporated herein by reference.

FIELD OF THE INVENTION

The present application relates generally to additive manufacturing and, in particular, to the preparation of three-dimensional structures through the manipulation of shaped energy beams.

BACKGROUND OF THE INVENTION

The field of additive layer manufacturing (ALM) has seen many important advances in the fabrication of articles directly from computer controlled databases.

These advances have greatly reduced the time and expense required to fabricate articles, particularly in contrast to conventional machining processes in which a block of material, such as metal, is machined to engineering drawings.

Previous technologies have relied on two-dimensional scanning of a focused laser beam in which the beam is either one or both of translated and re-oriented onto predetermined areas of a powder bed layer to form individual layers of a construct, such as a medical implant. Use of a moving beam can result in thermal gradient generation which is known to contribute to residual stress build-up in the parts being created. Compensation for this issue, such as through the use of powder consolidation dynamics which has been widely implemented in current additive manufacturing technology, can limit the power and scan speed in attaining an even consolidation, thus negatively impacting production throughput. Moreover, localized light generated by high power lasers and used in conventional strategies can have extremely high power densities and thus may vaporize rather than consolidate scanned raw material.

To address some of these issues, a technique has been developed to adjust the cross-sectional shape of a laser beam into a variety of shapes, e.g., circular and polygonal cross-sectional shapes, to control the distribution of energy delivered to the substrate. During such processes, either one or both of the cross-sectional shape and energy intensity profile of the laser beam may be adjusted. Although search techniques may help to address issues with individual layers of a build construct, these techniques do not address the impact caused by the addition of subsequent layers during an additive manufacturing build process.

Thus, further improvements are needed in additive manufacturing technology to minimize thermal stress and increase build rates.

BRIEF SUMMARY OF THE INVENTION

In accordance with an aspect, an entire first region of a first layer of a first material may be at least partially melted and fused together to form a first component layer. An entire first region of a second layer of a second material having a second inner perimeter and a second outer perimeter spaced from the second inner perimeter may be at least partially melted simultaneously and fused together to form a second component layer fused to the first component layer. Generally, the total energy applied to the second layer of material is sufficient to at least partially re-melt the first layer of the first material to a desired depth profile. In some arrangements, the first material and the second material may be the same material. In some arrangements, either one or both of the first material and the second material may be powder materials. In some arrangements, the first material may be made of any one or any combination of metals, ceramics, and plastics. In some arrangements, the entire first region of the first layer may define a first inner perimeter. In some such arrangements, a projection of the first inner perimeter may circumscribe or inscribe a projection of the second inner perimeter. In some other arrangements, a projection of the first inner perimeter may be the same as a projection of the second inner perimeter.

In some arrangements, either one or both of the first region of the first layer of the first material and the first region of the second layer of the second material, which in some arrangements may be the same as the first material, may be fabricated by directing a high energy beam from a beam-generating apparatus, such as may be used with additive manufacturing machines, onto either one or both of the respective first layer and second layer. In some arrangements, the high energy beam may be a laser beam, and in some other arrangements, the high energy beam may be an electron beam, i.e., an e-beam. In some such arrangements, one or more obstacles, e.g., a mask or masks, may be placed between a lens of the high energy beam and either one or both of the respective first layer and second layer during formation of the respective first region of the first layer and the first region of the second layer, as desired, impede an unimpeded portion of the high energy beam reaches the respective first layer of the first material and second layer of the second material. When a plurality of masks are used, the masks may be adjacent to each other to collectively impede a portion of the high energy beam larger than the portion of the high energy beam that the masks would impede separately, or the masks may be spaced apart from each other such that they impede different portions of the high energy beam.

In accordance with another aspect, a component may be fabricated by a process. In this process, only a portion of a first layer of a first material may be at least partially melted to define a first component layer of the component in which the entirety of the first component layer may be formed simultaneously. In this process, only a portion of the second layer of a second material may be at least partially melted to define a second component layer of the component in which the entirety of the second component layer may be formed simultaneously and in which the second component layer may be attached to the first component layer.

In some arrangements, a projection of the second component layer may circumscribe or be inscribed by a projection of the first component layer.

In some arrangements, a first high energy beam may be directed onto the respective first and second layers in order to at least partially melt the portions of the first and second layers. In some such arrangements, the first high energy beam may be shaped when directed onto the respective first and second layers. In some arrangements, the first high energy beam may be shaped such that a profile of the first high energy beam when the first high energy beam is directed towards, and prior to an intersection of the first high energy beam with, either one or both of the first layer and the second layer is in the shape of a polygon, a hollow polygon, an oval, a circle, or an annulus. In some arrangements, the shape of the first high energy beam may be altered from a first shape used to define the first component layer to a second shape used to define the second component layer. In some arrangements, the shape of the first high energy beam may be altered by a diffractive optical element (DOE). In some arrangements, the first high energy beam may be impeded by one or more obstacles such that the profile of the first high energy beam is altered. In some arrangements, the shape of the first high energy beam may be altered by a combination of a DOE and the use of one or more obstacles in which the one or more obstacles may be used to control the fidelity, e.g., sharpen the profile, of the first high energy beam. In some such arrangements, the first high energy beam may be shaped such that the profile of the first high energy beam directed onto the first layer is in the shape of a polygon, a hollow polygon, an oval, a circle, or an annulus, and, in such arrangements, the obstacle may impede only a portion of the first high energy beam such that the first component layer is in the form of a portion of a polygon, a hollow polygon, an oval, a circle, or an annulus corresponding to the shape of a respective unimpeded portion of the first high energy beam. When a plurality of obstacles are used, the obstacles may be adjacent to each other to collectively impede a portion of the high energy beam larger than the portion of the high energy beam that the obstacles would impede separately, or the obstacles may be spaced apart from each other such that they impede different portions of the high energy beam.

In some arrangements, a primary high energy beam may be split into multiple high energy beams that may include the first high energy beam. In such arrangements, another portion of the first layer may be at least partially melted to define a first additional component layer of a second component in which the entirety of the first additional component layer may be formed simultaneously and in which the first additional component layer may be spaced from the first component layer. In such arrangements, another portion of the second layer may be at least partially melted to define a second additional component layer of a second component in which the entirety of the second additional component layer may be formed simultaneously and in which the second additional component layer may be spaced from the second component layer. In such arrangements, the second additional component layer may be attached to the first additional component layer. In some such arrangements, the second additional component layer may be attached to the first additional component layer by the at least partial melting of the portion of the second layer at least partially melted to define the second additional component layer.

In some arrangements, a projection of the second additional component layer may circumscribe or may be inscribed by a projection of the first additional component layer. In some arrangements, either one or both of (i) outer perimeters of the first component layer and the first additional component layer may be the same and (ii) outer perimeters of the second component layer and the second additional component layer may be the same.

In some arrangements in which the first component layer and the second component layer are at least partially melted by the first high energy beam, the first high energy beam may be a laser beam or a plurality of laser beams, and the component may be fabricated using a laser beam generating apparatus. In some such arrangements, a focusing lens of the laser beam generating apparatus that directs the first high energy beam onto the first layer of the first material may be translated to an adjusted position for performing the step of at least partially melting the portion of the second layer of the second material. In some such arrangements, the focusing lens may be moved via a linear encoder.

In some arrangements, after at least partially melting the portion of the first layer of the first material, a focusing lens may be translated relative to a first axicon of a laser beam generating apparatus. In such arrangements, the first axicon may be spaced from the second axicon, and the focusing lens, the first axicon, and the second axicon may be aligned along a longitudinal axis.

In some arrangements, either one or both of (i) at least the portion of the first layer of the first material may be heated prior to at least partially melting the portion of the first layer and (ii) at least the portion of the second layer of the second material may be heated prior to at least partially melting the portion of the second layer. In some such arrangements, either one or both of the entirety of the first layer and the entirety of the second layer may be heated prior to at least partially melting the respective first layer and second layer. In some arrangements, the one or more heated portions of the first layer and the second layer may be heated by the first high energy beam or by another high energy beam, although the heated portions may be heated by other processes or equipment such as but not limited to any one or any combination of electrically resistive coils, an infrared heat source, and a ceramic heat source that may be placed in the vicinity of either one or both the first layer of the first material or the second layer of the second material.

In some arrangements, either one or both of the first component layer may surround unheated first material and the second component layer may surround unheated second material. In some arrangements, either one or both of (i) the portion of the first layer of the first material may be closed and symmetric and (ii) the portion of the second layer of the second material may be closed and symmetric.

In some arrangements, the portion of the first layer may be a first portion of the first layer. In such arrangements, a second portion of the first layer adjacent to the first portion of the first layer may be at least partially melted to further define the first component layer. In some such arrangements, the first portion of the first layer may circumscribe or may be inscribed by the second portion of the first layer. In some such arrangements, the first portion of the first layer may be directly attached to the second portion of the first layer.

In some arrangements including in some of the aforementioned arrangements in which the second portion of the first layer is at least partially melted to further define the first component layer, the portion of the second layer may be a first portion of the second layer. In such arrangements, a second portion of the second layer adjacent to the first portion of the second layer may be at least partially melted to further define the second component layer. In some such arrangements, the first portion of the second layer may circumscribe or be inscribed by the second portion of the second layer. In some such arrangements, the first portion of the second layer may be attached to the second portion of the second layer. In some arrangements, the second portion of the second layer may be directly attached to either one or both of the first portion of the first layer and the second portion of the first layer.

In some arrangements, the portion of the second layer may be a first portion of the second layer. In such arrangements, a second portion of the second layer adjacent to the first portion of the second layer may be at least partially melted to further define the second component layer. In some such arrangements, the second portion of the second layer is at least partially melted to form a portion of the second component layer that has a different porosity than a portion of the second component layer formed by at least partially melting the first portion of the second layer. In some such arrangements, the portion of the first layer may be a first portion of the first layer. In such arrangements, a second portion of the first layer adjacent to the first portion of the first layer may be at least partially melted to further define the first component layer. In some such arrangements, the second portion of the first layer is at least partially melted to form a portion of the first component layer that has a different porosity than a portion of the first component layer formed by at least partially melting the first portion of the first layer.

In some arrangements, the portion of the first layer may be a first portion of the first layer and the portion of the second layer may be a first portion of the second layer. In such arrangements, a second portion of the first layer adjacent to the first portion of the first layer may be at least partially melted to further define the first component layer. In such arrangements, a third portion of the first layer adjacent to either one or both of the first portion and the second portion of the first layer may be at least partially melted to further define the first component layer. In some such arrangements, the third portion of the first layer is at least partially melted to form a portion of the first component layer that has a different porosity than a portion of the first component layer formed by the step of at least partially melting the portion or portions of the first layer to which the third portion of the first layer is adjacent. In some such arrangements, a second portion of the second layer adjacent to the first portion of the second layer may be at least partially melted to further define the second component layer. In some such arrangements, a third portion of the second layer adjacent to either one or both of the first portion and the second portion of the second layer may be at least partially melted to further define the second component layer. In some such arrangements, the third portion of the second layer is at least partially melted to form a portion of the second component layer that has a different porosity than a portion of the second component layer formed by at least partially melting the portion or portions of the second layer to which the third portion of the second layer is adjacent.

In some arrangements, the fabricated component may be an acetabular cup component, a patella component, a tibial component, a spinal component, e.g., an interbody device, or any other implantable product or surgical instrument.

In some arrangements, the first material and the second material may be any one or any combination of one or more metal, one or more plastics, and one or more ceramics. In some arrangements, the first material and the second material may be made of metal powder. In some such arrangements, the metal powder may be made of any one or any combination of titanium, titanium alloys, stainless steel, cobalt chrome alloys, tantalum, silver, and niobium. In arrangements in which the first material and the second material are metal powders, the first material may be deposited onto a substrate to form the first layer of the first material and the second material may be deposited onto the first layer of the first material. In some such arrangements, the second material may be further deposited onto the first component layer.

In some arrangements, the first material and the second material may be made of the same material. In some arrangements, the first material and the second material may be made of different materials.

In accordance with another aspect, a component may be fabricated by a process. In this process, a first region of a first layer of a first material may be at least partially melted and a second region of a second successive layer of the first material may be at least partially melted over the first layer to define a first component section of the component in which the entirety of the first region may be at least partially melted simultaneously and in which the entirety of the second region may be at least partially melted simultaneously. In this manner, the first component section may be fabricated to be porous or substantially solid. In this process, a third region of a third layer of a second material may be at least partially melted and a fourth region of a fourth successive layer of the second material may be at least partially melted over the first component section to define a second component section of the component in which the entirety of the third region may be at least partially melted simultaneously and in which the entirety of the fourth region may be at least partially melted simultaneously. In this manner, the second component section may be porous when the first component section is substantially solid and the second component section may be substantially solid when the first component section is porous. In some arrangements, the first component section and the second component section may be fused such that the component is integral, i.e., monolithic such that the first component section and the second component section are inseparable without fracture of either one or both of the first component section and the second component section.

In some arrangements, the first component section may have a gradient or graded porosity when the first component section is porous. In some arrangements, the second component section may have a gradient or graded porosity when the second component section is porous.

In some arrangements, a fifth region of a fifth layer of a third material may be at least partially melted and a sixth region of a sixth successive layer of the third material may be at least partially melted over the first and the second component sections to define a third component section of the component in which the entirety of the third region is at least partially melted simultaneously and in which the entirety of the fourth region is at least partially melted simultaneously. In such arrangements, the third component section may be porous when the second component section is substantially solid and the third component section may be substantially solid when the second component section is porous. In some arrangements, the third component section and the second component section may be fused such that the component is integral as defined above.

In some arrangements, the fabricated component may be an acetabular cup component, a patella component, a tibial component, a glenoid component, a cone augment, a spinal component, e.g., an interbody device, or any other implantable product or surgical instrument.

In some arrangements, the first material and the second material may be any one or any combination of one or more metal, one or more plastics, and one or more ceramics. In some arrangements, the first material and the second material may be made of metal powder. In some such arrangements, the metal powder may be made of any one or any combination of titanium, titanium alloys, stainless steel, cobalt chrome alloys, tantalum, silver, and niobium. In arrangements in which the first material and the second material are metal powders, the first material may be deposited onto a substrate to form the first layer of the first material and the second material may be deposited onto the first layer of the first material. In some such arrangements, the second material may be further deposited onto the first component layer.

In some arrangements, the first material and the second material may be made of the same material.

BRIEF DESCRIPTION OF THE DRAWINGS

A more complete appreciation of the subject matter of the present invention and various advantages thereof may be realized by reference to the following detailed description and the accompanying drawings, in which.

DETAILED DESCRIPTION

Figure 1:
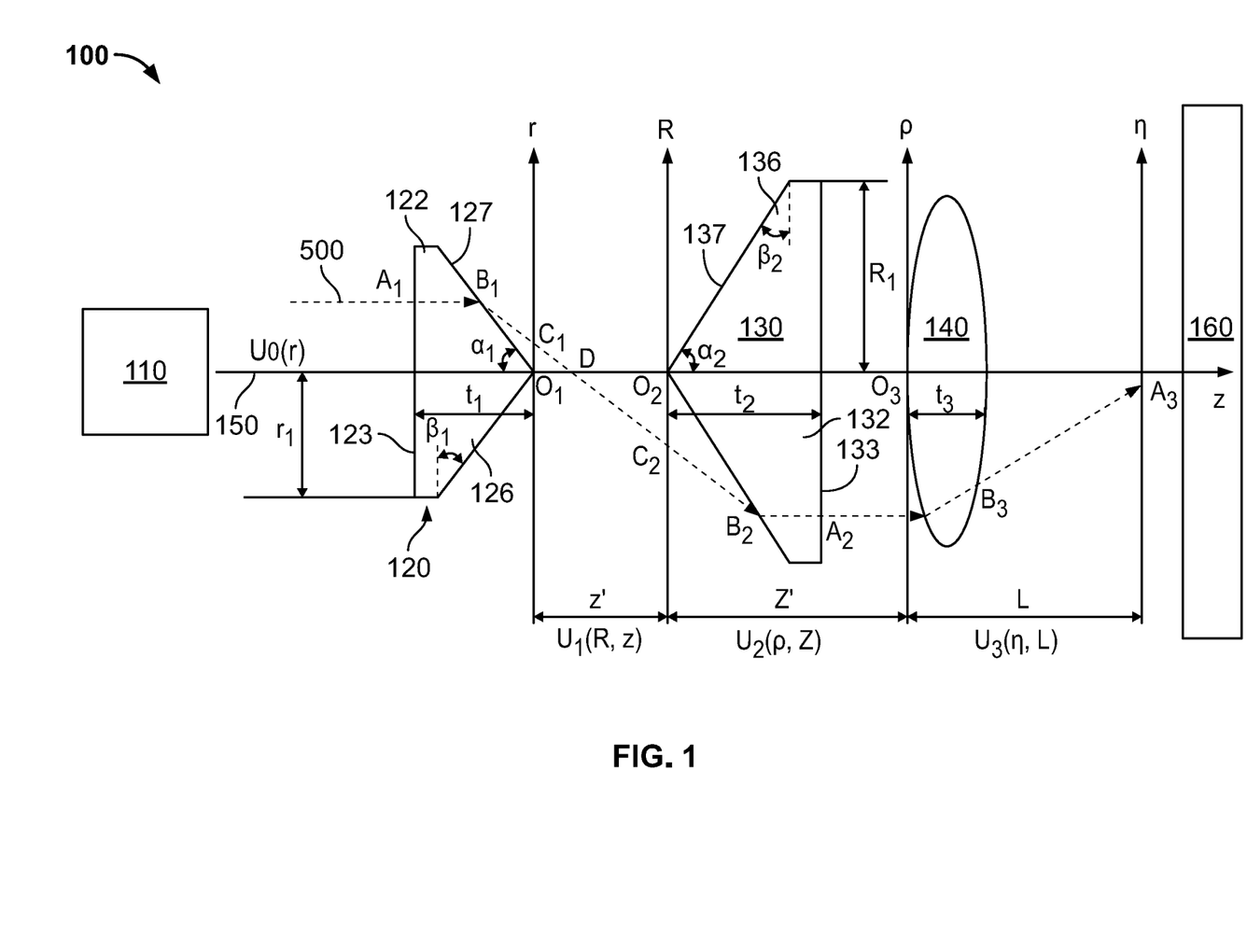
FIG. 1 is a cross-sectional elevation view of a portion of a system for generating a high energy beam to fabricate a component in accordance with an embodiment.

Referring now to the drawings, as shown in FIG. 1, system 100 generally includes energy beam source 110, first lens 120, second lens 130, substrate 160 for supporting raw material, and focusing lens 140 for projecting a shaped beam profile onto the raw material in forming a build construct, e.g., a medical implant. Any or all of these components of system 100 may be separate components that interact together or may be attached to some or all of the other components such as through fasteners. Any or all of these components may also be enclosed within a housing. Optical central axis 150 divides each of first lens 120, second lens 130, and focusing lens 140. As in this example, each of first lens 120, second lens 130, and focusing lens 140 preferably may be made from fused silica of refractive index p or of a suitably transparent material for the laser wavelength being employed. Energy beam source 110 preferably may be a high energy beam generating apparatus, such as an apparatus for emitting a laser beam, although other beams that at least partially melt materials to fuse such material to other similar or different materials upon solidification, e.g., metals, ceramics, and plastics, are within the scope of the present technology. Energy beam source 110 may be part of an additive manufacturing machine, e.g., a metal-based additive manufacturing machine. The optical train of any commercially manufactured machine in theory can be removed and replaced by the proposed optical design.

As shown, first lens 120 and second lens 130 may be a negative axicon for converging an energy bean and a positive axicon for diverging an energy beam, respectively. First lens 120, as an axicon in this example, includes base 122 having base surface 123 and cone 126 having cone surface 127 with tip $O_1$ along central axis 150 defining an origin along first transverse axis r. First lens 120 is defined by radius $r_1$ of base surface 123, tip maximum thickness $t_1$ between base surface 123 and tip $O_1$, tip angle $\alpha_1$ between central axis 150 and cone surface 127, and base angle $\beta_1$ between a line parallel to base surface 123 and cone surface 127 (base angle $\beta_1$ is given when $\alpha_1$ is defined). Similarly, second lens 130 includes base 132 having base surface 133 and cone 136 having cone surface 137 with tip $O_2$ along central axis 150 defining an origin along second transverse axis R. Second lens 130 is defined by radius $R_1$ of base surface 133, tip maximum thickness $t_2$ between base surface 133 and tip $O_2$, tip angle $\alpha_2$ between central axis 150 and cone surface 137, and base angle $\beta_2$ between a line parallel to base surface 133 and cone surface 137 (base angle $\beta_1$ is given when $\alpha_2$ is defined).

Figure 2:
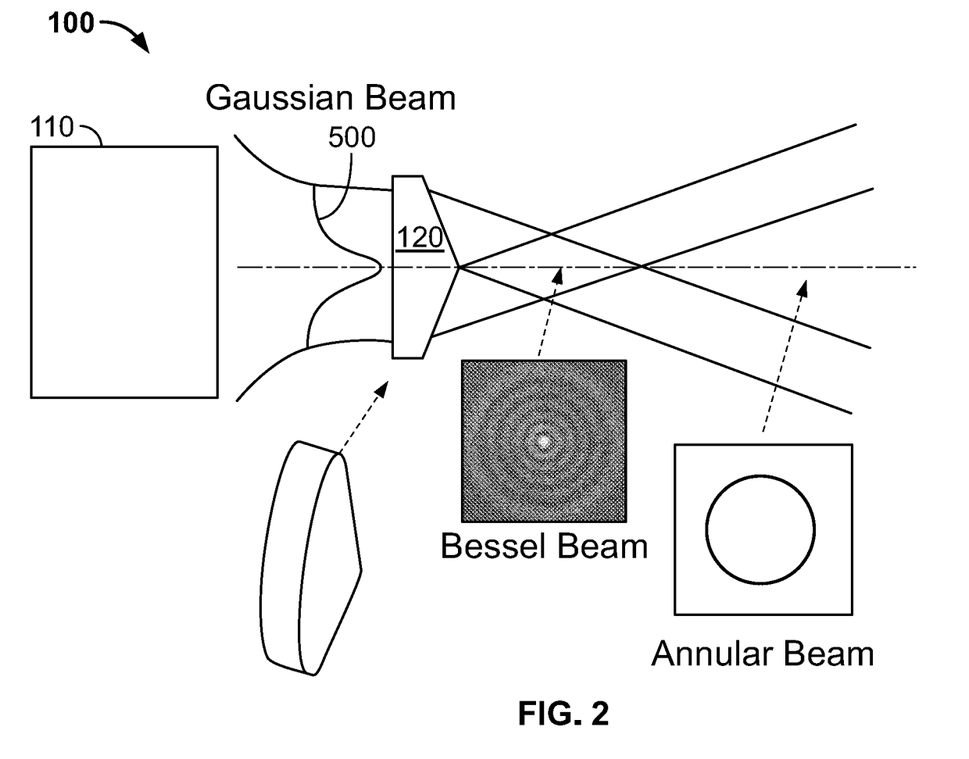
FIG. 2 is a cross-sectional expanded elevation view of a portion of the system of FIG. 1.

As shown in FIG. 2, input energy beam 500 preferably may be a Guassian beam in accordance with the present technology. When input energy beam 500 passes through first lens 120, a Bessel beam and subsequently an annular beam are formed prior to the energy beam passing through second lens 130. In the example shown, $\alpha_1 = \alpha_2$ and likewise $\beta_1 = \beta_2$ such that the axicon refractive system of first lens 120 and second lens 130 collimates an input energy beam received through the refractive system. Optimally, first lens 120 and second lens 130, when axicons, have as sharp, i.e., pointed, a tip as possible to optimize the refractive axicon system. In this example, as shown, first lens 120 has a smaller profile than second lens 130, although smaller or larger axicons may be used for either of these lenses. The relative sizes of the profiles of first lens 120 and second lens 130 define a magnification ratio for the energy beam.

Focusing lens 140 preferably is a convex lens, a plano-convex lens, or a meniscus, i.e., convex-concave, lens with a radius η equal to or greater than second lens 130 and a thickness $t_3$. The point of focusing lens 140 along central axis 150 that is nearest to second lens 130 defines origin $O_3$ along transverse axis p.

In the example shown, the Guassian input energy beam electrical field as a function of the distance r from central axis 150 may be $U_0(r)$ as the beam first enters first lens 120. Tip $O_1$ and tip $O_2$ are separated a distance z' in which over the distance z', the beam electrical field is given as a function of the radius R and the separation distance z', i.e., $U_1(R, z)$. Tip or origin $O_2$ and origin $O_3$ are separated a distance Z' in which over the distance Z', the beam electrical field is given as a function of the refractive index p and separation distance Z', i.e., $U_2(\rho, Z')$. Origin $O_3$ and origin $\Lambda_3$ are separated an adjustable distance L corresponding to a focal length of focusing lens 140 in which origin $\Lambda_3$ corresponds to a center of where the beam electrical field impinges upon the raw material supported by substrate 160 during proper operation of system 100. Over the distance L, the beam electrical field is given as a function of radius η of focusing lens 140 and focal length L, i.e., $U_3(\eta, L)$. As the radius η for a given system 100 is fixed (until focusing lens 140 is replaced by or, in some instances, coupled with another focusing lens), beam electrical field $U_3(\eta, L)$ may be controlled solely by focal length L.

Figure 3:
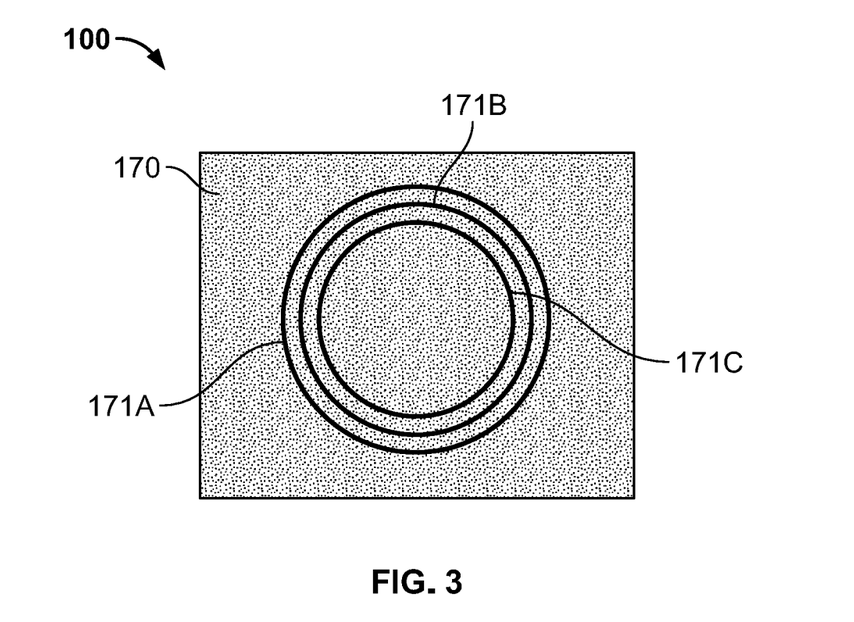
FIG. 3 is a plan view of a layer of a component being fabricated within a powder layer in accordance with another embodiment.

When system 100 generates a Guassian energy beam, focusing lens 140 converges the beam as received from second lens 130 into beam electrical field $U_3(\eta, L)$ in the shape of an annulus, i.e., a ring, onto a layer of the raw material, as in the example of FIG. 3 described further herein. Other two-dimensional shapes, i.e., shapes that are more than a spot, may be utilized as described further herein. Beam shaping is the process of redistributing the irradiance and phase of a beam of optical radiation. The beam shape is defined by the irradiance distribution, and the phase of a shaped beam is a key factor in determining the propagation properties of a beam profile.

By using shaped beam profiles, the entireties of any and all layers of a build construct may be formed at the same time. In this manner, each layer is subjected to a constant energy/unit area, thus avoiding reheating, e.g., by resintering or remelting, previously heated (e.g., sintered or melted) portions of a layer of a build construct while heating another portion of a layer of the build construct, such as may occur during raster scanning of a layer using conventional additive manufacturing techniques.

Focusing lens 140 may be coupled, such as by being mounted by a fastener, an adhesive, or by another mechanical connection, to a linear encoder. In this manner, focusing lens 140 may be translated relative to origin $\Lambda_3$ to vary the perimeter, in this case diameter, of the annulus formed by the beam onto a layer of the raw material. Additionally, adjustment of focal length L causes an equal and opposite adjustment of separation distance Z'. In this manner, adjustment of focal length L also adjusts the width of the beam annulus formed onto the layer of raw material. In some arrangements, varying positions of focusing lens 140 during the building of a construct may be preset in a file, such as a stereolithography file, i.e., an .STL file, for use with a software program, such as computer-aided design (CAD) software, for manipulation of .STL files and for providing instructions to additive manufacturing machines. Alternatively, focusing lens 140 could be manually adjusted.

With reference to FIG. 3, the raw material preferably may be a powder or otherwise pulverulent material. Such powder material may be made of any one or any combination of metals, ceramics, and plastics. Such metal powders preferably may be any one or any combination of titanium, titanium alloys, stainless steel, cobalt chrome alloys, tantalum, silver, and niobium. Such ceramic powders preferably may be but are not limited to being alumina, zirconia, bioglass and bioglass formulations, hydroxyapatite and hydroxyapatite formulations, or combinations thereof. Such plastic powders preferably may be but are not limited to being aryl ether ketone formulations such as polyaryletherketone (PAEK), nylon and nylon formulations, polyglycolide/poly(glycolic acid) (PGA), polylactide (PLA), poly (L-lactide) (PLLA), and variations and combinations thereof. Using system 100, in some arrangements, multiple regions of a powder layer may be at least partially melted for fusing of the powder particles. In the example of FIG. 3, first portion or first region 171A, second portion or second region 171B, and third portion or third region 171C of a single deposited powder layer 170 are generated by separate energy beam impingements on the powder layer. Although the example shows regions 171A, 171B, 171C being separated for illustration purposes, first region 171A and third region 171C preferably attach to second region 171B on opposite sides of the second region to form a component layer of a build construct, which may be a first or lowest component layer lying directly on substrate 160 (in which the rest of powder layer 170 may also lie directly on substrate 160) or any successive layer above the lowest component layer. Regions 171A, 171B, 171C may be formed in any order, and in some arrangements regions 171A, 171B, 171 may be separated upon fabrication as desired. Additionally, any one or any combination of first region 171A, second region 171B, and third region 171C may be formed with a predetermined porosity. For example, region 171B may be porous while the other regions are solid or substantially solid such that a solid-porous-solid component layer is formed or regions 171A, 171C may be porous while region 171B is solid or substantially solid such that a porous-solid-porous component layer is formed. In addition, any such adjacent regions 171A, 171B, 171C may have differing porosities such that a gradient porosity may be formed within the component layer of the build construct. Of course, more than three (3) regions may constitute a component layer, and any combination of such layers may be porous or at least substantially solid.

Figure 4:
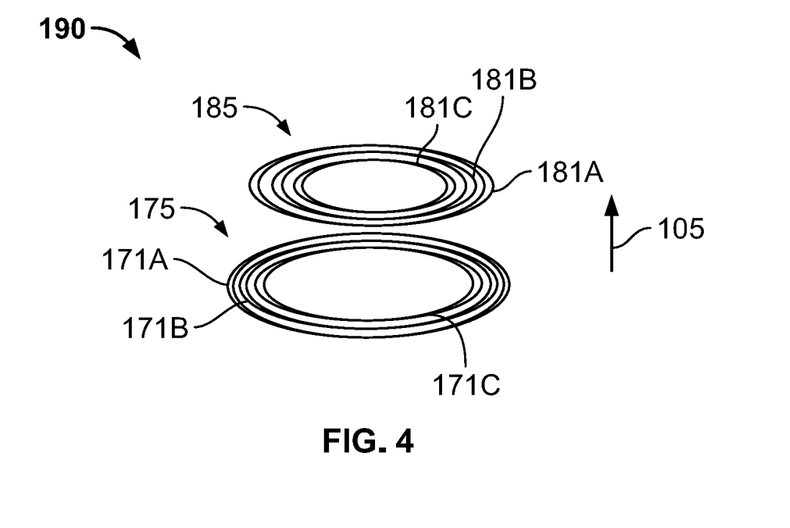
FIG. 4 is an exploded view of two layers of the component of FIG. 3 being fabricated.

Referring now to FIG. 4, first region 171A, second region 171B, and third region 171C may constitute first component layer 175 within first powder layer 170. Similarly, fourth region 181A, fifth region 181B, and sixth region 181C may constitute second component layer 185 formed in a successive powder layer deposited onto first powder layer 170. In this example, fourth region 181A has a perimeter, in this case a diameter, that is smaller than the perimeter of first region 171A but larger than the perimeter of second region 171B. Likewise, fifth region 181B has a perimeter that is smaller than the perimeter of second region 171B but larger than the perimeter of third region 171C and sixth region 181C has a perimeter that is smaller than the perimeter of third region 171C.

Although the example shows regions 181A, 181B, 181C being separated for illustration purposes, fourth region 181A and sixth region 181C preferably attach to fifth region 181B on opposite sides of the fifth region to form a further component layer of the build construct. Like regions 171A, 171B, 171C, any one or any combination of regions 181A, 181B, 181C may be porous or at least substantially solid. Additionally, although the example shows second component layer 185 being separated from first component layer 175 for illustration purposes, the second component layer preferably attaches to first component layer 175, in this example to form portions of a component, i.e., a construct. Accordingly, as in this example, fourth region 181A attaches to and is supported by both first region 171A and second region 171B, fifth region 181B attaches to and is supported by second region 171B and third region 171C, and sixth region 181C attaches to and is supported by third region 171C. In this manner, a converging construct 190 (only a portion of which is shown) is formed in the direction of arrow 105 relative to substrate 160. Continuing to form component layers with corresponding regions of smaller and smaller diameter eventually produces a hemispherical construct, such as medical implant 211 shown in FIG. 6 in the form of an acetabular cup. In some alternative arrangements, any or all of vertically adjacent regions 171A and 181A, 171B and 181B, 171C and 181C may have differing porosities such that a gradient porosity may be formed by the combination of the first component layer and the second component layer.

Figure 5A:
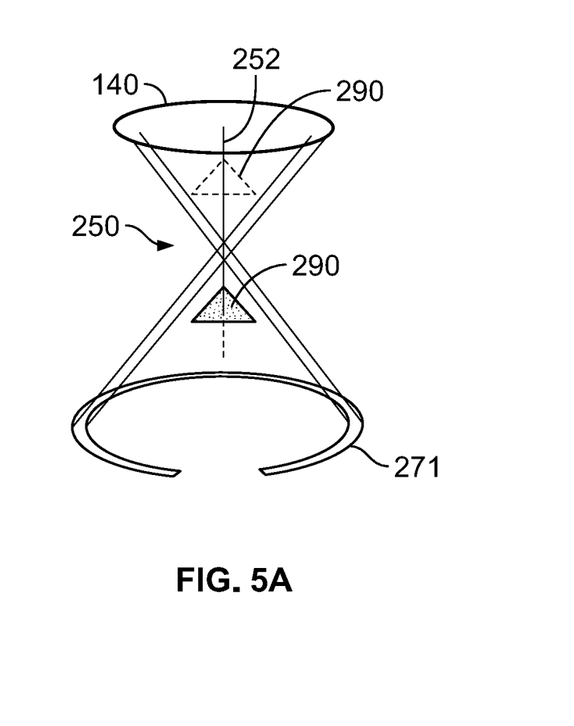
FIGS. 5A and 5B are schematics of components being fabricated by a high energy beam using an obstacle in accordance with another embodiment.
Figure 5B:
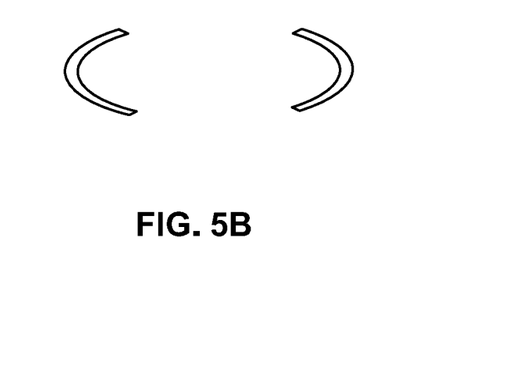

As shown in FIG. 5A, obstacle 290, which may be in the form of a mask, is positioned after, i.e., downstream of, a focusing lens such as focusing lens 140 of system 100. As in the example shown, obstacle 290 may be placed below an overlap of beam 250 or alternatively may be placed above the overlap of the beam as shown in broken lines. In this manner, obstacle 290 completely impedes or disrupts a portion of beam 250 such that a section of beam 252 does not reach the powder layer and only region 271 is melted or partially melted by the beam. Obstacle 290 may be made of any one or any combination of highly reflective materials such as but not limited to metals, e.g., copper, aluminum, or silver, as well as graphite and silica. As shown, obstacle 290 may have a triangular profile, e.g. may be in the form of a pie slice, although any profile that completely disrupts a portion of a high energy beam may be used. In using obstacle 290, region 271 formed by beam 250 is in the form of a partial, i.e., incomplete, annulus. Additional partial annuluses (or other formed shapes) may then be formed and fused to a partial annulus (or other formed shape) in a layer formed immediately prior to each additional partial annulus (or other formed shape) until a desired complete component or portion of a component is fabricated. In some alternative arrangements, one or more masks may be positioned after a focusing lens to create multiple segments of an otherwise complete melted region formed by a beam, such as the multiple segments shown in the example of FIG. 5B.

Figure 6:
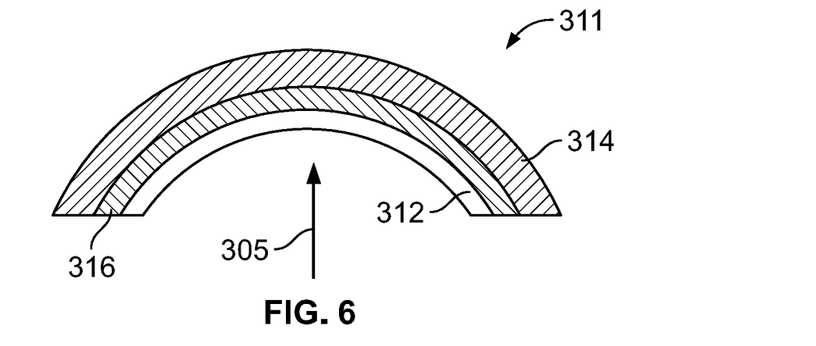
FIG. 6 is a cross-sectional elevation view of a component fabricated in accordance with another embodiment.

As shown in FIG. 6, similar such constructs, such as any of those disclosed in U.S. Pat. No. 8,728,387 incorporated herein by reference in its entirety, may also be formed in accordance with the present technology. In the example shown, a partially porous acetabular cup 311 is formed by fused annulus regions in successive powder layers in the direction of arrow 305 in accordance with the present technology in which section 312 has a first porosity, section 314 has a second porosity, and section 316 between section 312 and 314 has a substantially solid porosity (for example such that a polymer, e.g., polyethylene, cannot leach through section 312 to section 314). Acetabular cup 311 and other structures having related porosity profiles, such as those found in hip, shoulder, and knee prostheses, preferably may have a solid or substantially solid inner profile up to 4 mm in thickness, a porous outer profile up to 2 mm in thickness, and an overall diameter up to 64 mm. In alternative arrangements, the relative perimeters of corresponding regions of adjacent layers may be reversed to form a diverging construct relative to substrate 160, and in other alternative arrangements, the relative perimeters of corresponding regions of adjacent layers may be the same to form a straight-walled construct, e.g., a cylindrical construct.

Figure 7:
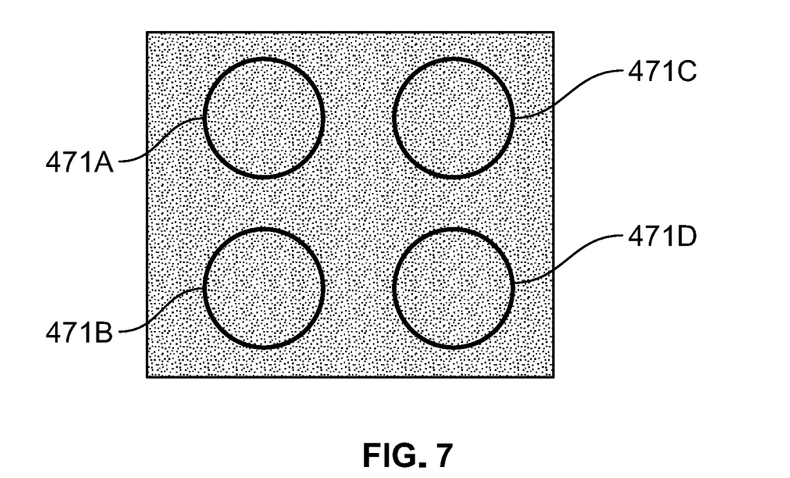
FIG. 7 is a plan view of a layer of separate components being fabricated within a powder layer in accordance with another embodiment.

In some alternative arrangements, a primary energy beam, such as a beam from energy beam source 110, may be split, such as by a diffraction grating, into multiple high energy beams. In this manner, multiple beam profiles may be applied to the same powder or other material layer to create a plurality of at least partially melted regions 471A-471D, such as annular melted regions, in the powder layer simultaneously, as shown in FIG. 7. As such, in some arrangements, component layers of multiple components may be formed in the same powder bed layer simultaneously. In other arrangements, multiple regions in the same layer of a single component may be formed simultaneously. In some arrangements, the multiple beam profiles may be concentric with each other resulting in the formation of layers of a single component in the forms shown with respect to first component layer 175 and second component layer 185 in FIG. 4. In some such arrangements or in other arrangements in which the multiple beam profiles may not be concentric with each other, the multiple beam profiles may be spaced apart from each other or they may overlap with each other in whole or in part. Such multiple beam profiles may be tangential.

Figure 8:
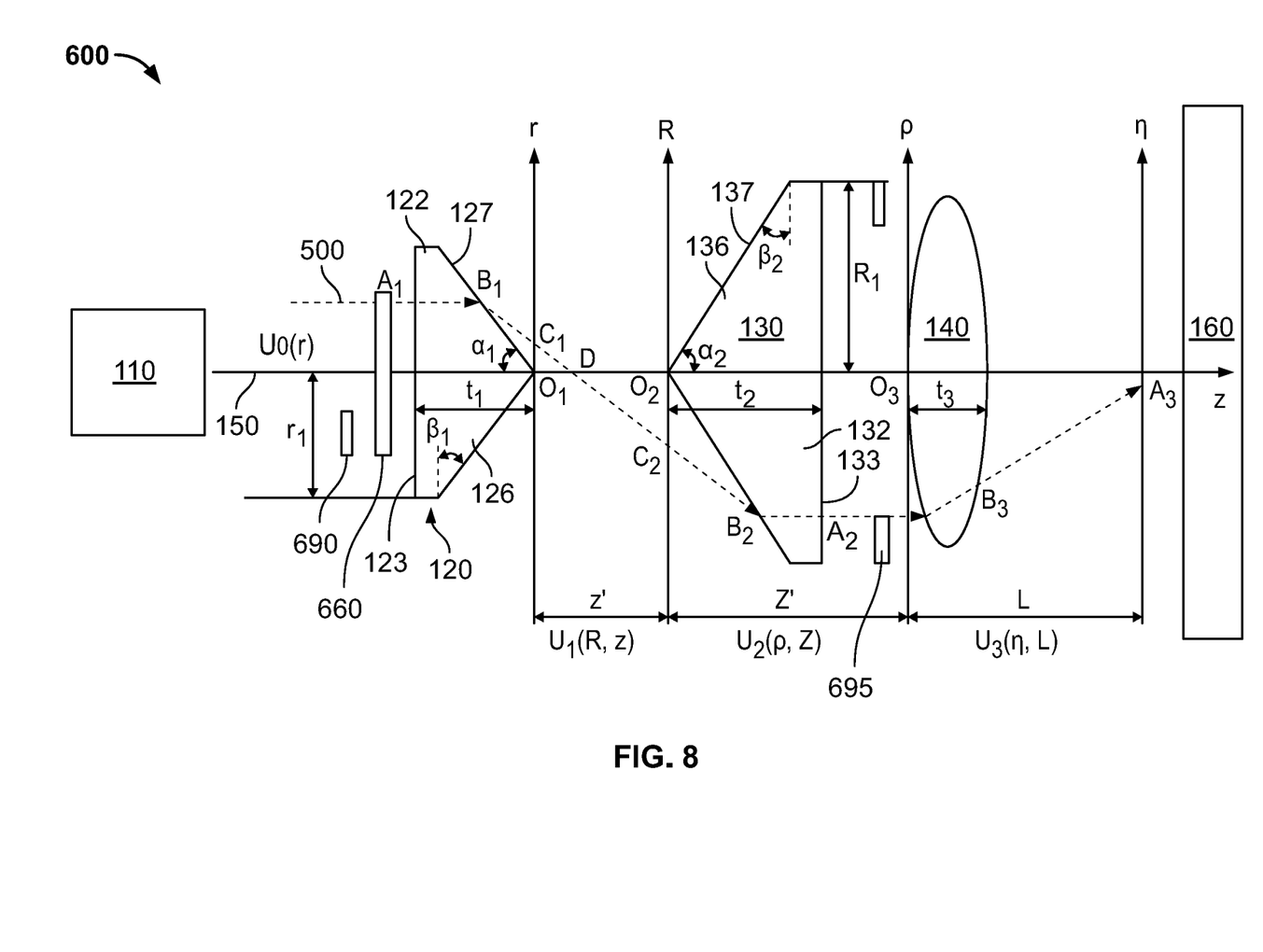
FIG. 8 is a cross-sectional elevation view of a portion of a system for generating a high energy beam to fabricate a component in accordance with another embodiment.

As shown in FIG. 8, in another example, system 600 generally includes system 100 as well as blocking obstacle 690 and diffractive optical element (DOE) 660 between energy beam source 110 and first lens 120 along with fidelity obstacle 695 between second lens 130 and focusing lens 140. Blocking obstacle 690 is between energy beam source 110 and DOE 660 such that the blocking obstacle completely impedes a portion of high energy beam 500. In this manner, only an unimpeded portion of high energy beam 500 passes through diffractive optical element 660. As in the arrangement shown, blocking obstacle 690 may be rotated within a plane generally perpendicular to high energy beam 500 such that different portions of high energy beam 500 may be impeded depending on the rotational location of the blocking obstacle. Through sequential rotation of blocking obstacle 690 and corresponding sequential emissions of high energy beam 500, a full annulus of a partially melted region may be produced sequentially.

Upon passing through DOE 660, high energy beam 500 is shaped by the DOE. For example, when high energy beam 500 is a Guassian beam, the energy beam peaks in the middle. The DOE, when used as a "top hat shaper" as known to those skilled in the art, produces a square, i.e., flat, top rather than a central curve in the middle of the beam. In the example shown, high energy beam 500 is impeded by blocking obstacle 690 prior to being shaped by DOE 660. In alternative arrangements, blocking obstacle 690 may be between DOE 660 and first lens 120 such that unimpeded high energy beam 500 is shaped by DOE 660 to have a square top.

As shown, in this example, fidelity obstacle 695 is in the form of an annulus. In this manner, an outer portion of high energy beam 500 exiting second lens 130 is cut off, thus sharpening, i.e., removing "feathering" and improving the fidelity, of the high energy beam prior to impingement of the beam upon focusing lens 140. In other arrangements, the fidelity obstacle may have a different shape, e.g., a hollow polygon.

It is to be understood that any combination of DOE 660, blocking obstacle 690, and fidelity obstacle 695 may be used with system 100. Thus, for example when only fidelity obstacle 695 is used among these three constituents of system 600, a portion of high energy beam 500, which will not have been shaped by DOE 660 or impeded by blocking obstacle 690 upon reaching fidelity obstacle 695, will be cut off so as to improve the fidelity of high energy beam 500.

In some alternative arrangements, beam profiles other than annular profiles, such as other ovular profiles or polygonal profiles including but not limited to triangular, square, and other rectangular profiles, may be used to prepare at least partially melted regions of powder or other material layers. Such beam profiles may be generated by ultra-high speed scanning systems that form one or more beams having a shape (e.g., a triangle) corresponding to the desired one or more beam profiles (e.g., a triangular beam profile) that are scanned across the powder bed. In this manner, solid or hollow build constructs or components which may be straight-walled or tapered may be produced. Such constructs may be in the form of a variety of shapes, such as but not limited to cones, truncated cones, pyramids, and other polyhedral or curved three-dimensional structures.

In some arrangements, other beam profiling processes may be used to form two-dimensional beams, i.e., beams that are more than a spot impinging on a material. Such processes include the use of apertured beams, field mappers, scanning mirror systems, and multi-aperture beam integrators. In some arrangements, an array of multiple laser spots could be formed, e.g., through the use of fiber lasers, to create a shaped beam profile In some arrangements, a powder layer may be preheated by an energy beam. The energy beam may be from the same energy beam source, such as energy beam source 110, or from another energy beam source. In this manner, thermal stress and melt pool instabilities may be prevented. The scanning strategy employed for the energy beam should influence the microstructure of the fabricated component and reduce residual stresses that would otherwise be present.

In some arrangements, system 100 may further include an additional heat source which may be used to maintain or augment the heat applied to the powder bed. In such arrangements, the additional heat source may be but is not limited to being any one or any combination of an additional laser, electrically resistive coils, an infrared heat source, and a ceramic heat source. In this manner, the temperature of a powder bed may be maintained through an energy balanced system or at least more closely controlled, as desired. Such a system would allow for the use of lower powered lasers and would reduce respective laser residence times necessary to melt regions of a powder bed.

It is to be understood that the disclosure set forth herein includes all possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the invention, and in the invention generally.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of fabricating a component comprising the steps of:
   directing a first laser beam through a focusing lens of a laser beam generating apparatus set at a first position onto only a portion of a first layer of a first material to at least partially melt the portion of the first layer of the first material and thereby to define a first component layer of the component, the entirety of the first component layer being formed simultaneously;
   translating the focusing lens towards or away from the first component layer to a second position different from the first position; and
   directing the first laser beam through the focusing lens set at the second position onto only a portion of a second layer of a second material to at least partially melt the portion of the second layer of the second material and thereby to define a second component layer of the component, the entirety of the second component layer being formed simultaneously, wherein the second component layer is attached to the first component layer.

2. The method of claim 1, wherein a projection of the second component layer circumscribes or is inscribed by a projection of the first component layer.

3. The method of claim 1, wherein the respective steps of directing the first laser beam onto the respective first and second layers comprise shaping the first laser beam.

4. The method of claim 3, wherein the first laser beam is shaped such that a profile of the first laser beam directed onto either one or both of the first layer and the second layer is in the shape of a polygon, an oval, or a circle.

5. The method of claim 3, further comprising a step of altering the shape of the first laser beam from a first shape used to define the first component layer to a second shape used to define the second component layer.

6. The method of claim 5, wherein the altering step is performed using a diffractive optical element.

7. The method of claim 3, further comprising the steps of impeding the first laser beam with an obstacle to alter a profile of the first laser beam.

8. The method of claim 7, wherein the first laser beam is shaped such that a profile of the first laser beam prior to an intersection of the first laser beam with the first layer is in the shape of a polygon, a hollow polygon, an oval, a circle, or an annulus, and wherein the obstacle impedes only a portion of the first laser beam such that the first component layer is in the form of a partial polygon, a partial hollow polygon, a partial oval, a partial circle, or a partial annulus corresponding to the shape of the profile of an unimpeded portion of the first laser beam.

9. The method of claim 3, wherein the first laser beam is shaped such that a profile of the first laser beam directed onto either one or both of the first layer and the second layer is in the shape of a hollow polygon or an annulus.

10. The method of claim 1, further comprising the steps of:
    splitting a primary laser beam into multiple laser beams including the first laser beam;
    at least partially melting another portion of the first layer to define a first additional component layer of a second component, the entirety of the first additional component layer being formed simultaneously and the first additional component layer being spaced from the first component layer; and
    at least partially melting another portion of the second layer to define a second additional component layer of the second component, the entirety of the second additional component layer being formed simultaneously and the second additional component layer being spaced from the second component layer, wherein the second additional component layer is attached to the first additional component layer.

11. The method of claim 1, wherein the focusing lens is translated via a linear encoder.

12. The method of claim 1, wherein the focusing lens is translated relative to a first axicon of the laser beam generating apparatus, and wherein the first axicon is spaced from a second axicon, and wherein the focusing lens, the first axicon, and the second axicon are aligned along a longitudinal axis.

13. The method of claim 1, further comprising either one or both of (i) a step of heating at least the portion of the first layer prior to the step of at least partially melting the portion of the first layer and (ii) a step of heating at least the portion of the second layer prior to the step of at least partially melting the portion of the second layer.

14. The method of claim 13, wherein the step of heating at least the portions of the first layer prior to the step of at least partially melting the portion of the first layer includes heating the portion of the first layer with the first laser beam or a second laser beam and the step of heating at least the portion of the second layers prior to the step of at least partially melting the portion of the second layer includes heating the portion of the second layer with the first laser beam or the second laser beam.

15. The method of claim 1, wherein either one or both of (i) the first component layer surrounds unheated first material and (ii) the second component layer surrounds unheated second material.

16. The method of claim 1, wherein the first material and the second material are made of the same material.

17. The method of claim 1, wherein the component is an acetabular cup component, a patella component, a tibial component, a spinal component, a cone augment, or a glenoid component.

18. The method of claim 1, wherein the first laser beam is sized differently when directing the first laser beam onto the first layer than when directing the first laser beam onto the second layer.

19. A method of fabricating a component comprising the steps of:
- at least partially melting a first region of a first layer of a first material and a second region of a second successive layer of the first material over the first layer to define a first component section of the component, the entirety of the first region being at least partially melted simultaneously, the entirety of the second region being at least partially melted simultaneously, and the first component section being porous or substantially solid; and
- at least partially melting a third region of a third layer of a second material and a fourth region of a fourth successive layer of the second material over the first component section to define a second component section of the component, the entirety of the third region being at least partially melted simultaneously, the entirety of the fourth region being at least partially melted simultaneously, and the second component section being porous when the first component section is substantially solid or the second component section being substantially solid when the first component section is porous, wherein the first component section and the second component section are fused such that the component is monolithic.

20. A method of fabricating a component comprising the steps of:
- at least partially melting a first portion of a first layer of a first material to define a first region of a first component layer of the component, the entirety of the first region of the first component layer being formed simultaneously;
- at least partially melting a second portion of the first layer adjacent to the first portion of the first layer to define a second region of the first component layer adjacent to the first region of the first component layer;
- at least partially melting a third portion of the first layer adjacent to either one or both of the first portion of the first layer and the second portion of the first layer to define a third region of the first component layer adjacent to one or both of the first region of the first component layer and the second region of the first component layer, respectively, wherein the third region of the first component layer has a different porosity than the one or both of the first region of the first component layer and the second region of the first component layer to which the third region of the first component layer is adjacent;
- at least partially melting a first portion of a second layer of the first material or of a second material different from the first material to define a first region of a second component layer of the component, the entirety of the first region of the second component layer being formed simultaneously,
- at least partially melting a second portion of the second layer adjacent to the first portion of the second layer to define a second region of the second component layer adjacent to the first region of the second component layer; and
- at least partially melting a third portion of the second layer adjacent to either one or both of the first portion of the second layer and the second portion of the second layer to define a third region of the second component layer adjacent to one or both of the first region of the second component layer and the second region of the second component layer, respectively, wherein the third region of the second component layer has a different porosity than the one or both of the first region of the second component layer and the second region of the second component layer to which the third region of the second component layer is adjacent,
- wherein the second component layer is attached to the first component layer.

* * * * *